US 6,562,309 B2

(12) United States Patent
Burke et al.

(10) Patent No.: US 6,562,309 B2
(45) Date of Patent: May 13, 2003

(54) PHOTOCATALYTIC SYSTEM

(75) Inventors: David H. Burke, Flint, MI (US); Thomas E. Archer, III, Clarence Center, NY (US)

(73) Assignee: Delphi Technologies, Inc., Troy, MI (US)

(*) Notice: Subject to any disclaimer, the term of this patent is extended or adjusted under 35 U.S.C. 154(b) by 211 days.

(21) Appl. No.: 09/748,731

(22) Filed: Dec. 26, 2000

(65) Prior Publication Data

US 2002/0081257 A1 Jun. 27, 2002

(51) Int. Cl.[7] .................................................. C01B 3/26
(52) U.S. Cl. ..................... 423/245.1; 60/274; 60/282; 60/299; 60/301; 204/157.3; 422/186.3; 422/211; 423/437.2; 423/580.1
(58) Field of Search ................. 204/157.3; 60/274, 60/282, 299, 301; 422/186.3, 211; 423/245.1, 437.2, 580.1

(56) References Cited

U.S. PATENT DOCUMENTS 4,888,101 A  * 12/1989  Cooper .................. 204/157.15
6,153,159 A     11/2000  Engeler et al. ........... 423/213.2

FOREIGN PATENT DOCUMENTS

JP           04066764 A   *  3/1992   ........... F02M/25/08

* cited by examiner

Primary Examiner—Stanley S. Silverman
Assistant Examiner—Maribel Medina-Sanabria
(74) Attorney, Agent, or Firm—Vincent A. Cichosz

(57) ABSTRACT

A photocatalytic device for photocatalytically treating evaporative emissions comprises a substrate with a photocatalyst. A shell is disposed about the substrate, and can optionally comprises one or more sections of transparent material capable of being penetrated by an ultra violet light. Additionally, sealing agent can optionally be disposed between the shell and sections of transparent material to provide a gas tight seal.

30 Claims, 2 Drawing Sheets

PHOTOCATALYTIC SYSTEM

TECHNICAL FIELD

This disclosure relates to evaporative emissions treatment systems and, more particularly, to a photocatalytic system for evaporative emissions treatment systems.

BACKGROUND

To reduce hydrocarbon emissions from engine exhaust, engine exhaust treatment devices typically employ catalytically active material comprising precious metals. However, conventional precious metal catalyst materials are essentially inactive at operating temperatures below 140° C. However, certain applications, such as an evaporative emissions system for a fuel system are not exposed to operating temperatures as high as 140° C. because such operating conditions are not desirable.

To overcome this disadvantage certain applications employ a photocatalytically active material to treat air, and various types of gases and liquids. For example, U.S. patent application Ser. No. 6,153,159 to Engeler et al., and assigned to Volkswagen AG, disclose one method for catalytically treating exhaust gas produced in an automotive application, which involves subjecting exhaust gas to an illuminated semiconductor photocatalyst in the presence of oxygen. Although Engeler et al. employs a semiconductor photocatalyst to catalytically treat exhaust gas, the catalytic converter design also requires heating a plurality of catalyst supporting plates within the converter.

Typically, photocatalytically active materials require less power to operate efficiently and cost-effectively, unless these photocatalytically active materials also require thermally activated materials, which require even more power to operate than photocatalytically active materials alone. The Engeler et al. catalytic converter design employs both photocatalytically active and thermally active catalytically materials to effectively treat exhaust gas in automotive applications. The design requires heating the catalyst supporting plates, in addition to illuminating a semiconductor photocatalyst, to effectively treat exhaust gases, thereby consuming more power than either a conventional photocatalytically based catalytic converter design or thermally based catalytic converter design.

Accordingly, there exists a need for a system and method for effectively and efficiently photocatalytically treating evaporative emissions.

SUMMARY

The drawbacks and disadvantages of the prior art are overcome by the photocatalytic device for fuel tank evaporative emissions, method for photocatalytically treating fuel system evaporative emissions, and the fuel tank evaporative emissions management system. The photocatalytic system for fuel tank evaporative emissions comprises a substrate comprising a photocatalyst and disposed within a shell. The shell preferably comprises one or more sections of transparent material capable of being penetrated by an ultra violet light transmission.

The method for photocatalytically treating evaporative emissions comprises introducing a quantity evaporated fuel to a photocatalytic device. The photocatalytic device comprises a substrate that is illuminated to photocatalytically treat the evaporated fuel.

The fuel tank evaporative emissions management system, comprises a fuel tank and a photocatalytic device in fluid communication with the fuel tank. Disposed in illuminative communication with a photocatalyst in the photocatalytic device is an ultraviolet light source. The photocatalytic device comprises substrate with the photocatalyst and a shell disposed about said substrate.

BRIEF DESCRIPTION OF THE DRAWINGS

Referring now to the Figures, which are meant to be exemplary, and not limiting, and wherein like elements are numbered alike in the figures.

DESCRIPTION OF THE PREFERRED EMBODIMENT

Figure 1:
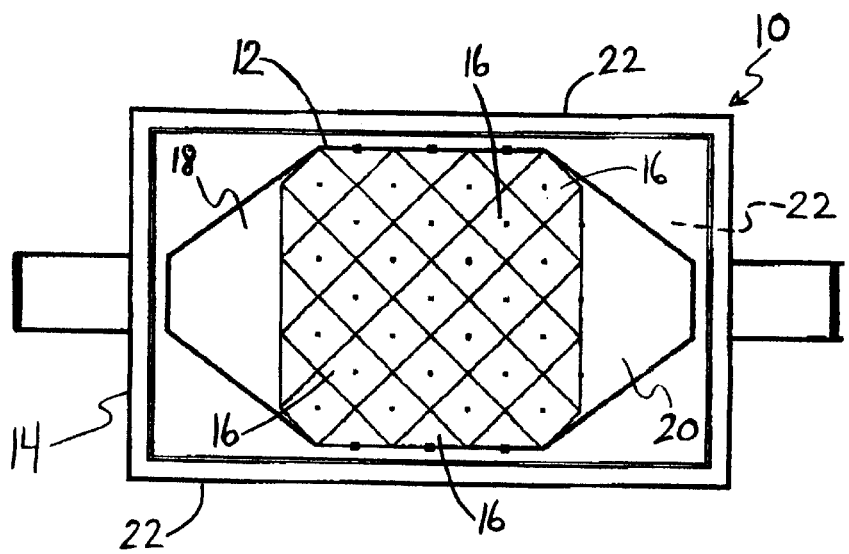
FIG. 1 is a partial cross-sectional top view of an embodiment of a photocatalyst system.

To photocatalytically treat evaporative emissions from an internal combustion engine a photocatalytic system is coupled to a carbon canister. As fuel is drawn from the fuel tank by the engine, evaporated fuel vapors are vented through a line connected from the tank to the carbon canister. The vented evaporated fuel vapors accumulate within the carbon canister, and hydrocarbon becomes entrained in the carbon filter of the carbon canister. As vapor begins escaping through an air port of the carbon canister, the vapor flows into a photocatalytic device. The photocatalytic device photocatalytically treats the vapor, and reduces the hydrocarbons to carbon dioxide and water vapors.

The photocatalytic device comprises one or more substrates comprising a photocatalytically active material. The substrate includes an exterior surface having structural features designed to maximize the amount of surface area available to support a photocatalyst. In addition, the structural features also facilitate flow separation so that the fluid flows turbulently to ensure all hydrocarbon molecules contact the catalyst. To facilitate the photocatalytic reaction the photocatalytic device further comprises one or more sections comprising transparent material, or material that allows ambient or artificial light to enter the photocatalytic device. The ambient or artificial light penetrates and strikes the photocatalytically active material which catalytically treats the fluid flow.

The photocatalytic device can comprise any type of receptacle capable of housing the substrate. The substrate can comprise any material designed for use in an evaporative emissions environment, and have the following characteristics: (1) capable of operating at temperatures up to about 90°C.; (2) capable of withstanding exposure to hydrocarbons, carbon dioxide, and/or water; and (3) having sufficient surface area and structural integrity to support the desired catalyst. Some possible materials include ceramic, molded plastic, carbon steel, and the like, and mixtures comprising at least one of the foregoing materials, and other conventional materials suitable for evaporative emission environments.

Although the substrate can have any size or geometry, the size and geometry are preferably chosen to optimize the surface area in the given photocatalytic device design parameters. Typically, the substrate has a honeycomb geometry, with the combs being any multi-sided or rounded shape, with substantially square, hexagonal, octagonal or similar geometries preferred due to the ease of manufacturing and increased surface area. In contrast to substrates employing thermally catalytically active material, substrates employing photocatalytically active material preferably optimize their exterior surface area, rather than their interior surface area, to maximize the photocatalytically active material's exposure to direct UV radiation. One or more structural features can be disposed upon the substrate's exterior to maximize the amount of surface area available to support one or more photocatalytically active materials. The structural features can also be part of the substrate, such as a molded plastic substrate. Possible structural features can comprise any geometry such as multi-sided or rounded, and, preferably, comprise a multi-sided geometry such as pyramidal, triangular, rectangular, pentagonal, hexagonal, heptagonal, octagonal, and the like, with pyramidal preferred. In addition to maximizing the surface area of the substrate, the structural features can also enhance the vapor flow by causing flow separation. The vapor flow can strike the structural features and flow around them thus creating flow separation. The vapors can then flow over a greater percentage of the substrate's surface area, and, likewise, contact a greater percentage of photocatalytically active material. To facilitate the flow separation one or more structure features can be removed from the inlet area of the substrate's exterior surface. The vapors can flow unobstructed into the substrate, separate amongst the structural features, and be photocatalytically treated.

Disposed on and/or throughout the substrate is a photocatalytically active washcoat for converting evaporative emissions to acceptable emissions levels. The photocatalytically active washcoat may comprise one or more photocatalytically active materials that are wash coated, imbibed, impregnated, physisorbed, chemisorbed, precipitated, or otherwise applied to the catalyst substrate. Possible photocatalytically active materials can include titanium oxides ($TiO_2$), and combinations comprising titanium oxide. In addition, additional catalytically active materials can be added to the photocatalytically active washcoat to enhance the photocatalytic reaction of the device. Possible additional catalytically active materials can include platinum, palladium, rhodium, and alloys, oxides and combinations comprising at least one of the foregoing catalytically active materials, and the like with platinum preferred. For example, about 0.1% platinum by weight of the photocatalytically active washcoat can be added to enhance the photocatalytic reaction of the device. In addition, a binder material such as aluminum oxide can be mixed with the photocatalytically active washcoat, according to the specification of the particular application. For example, the photocatalytically active washcoat can comprise about 50% or greater of aluminum oxide by weight of the washcoat. The binder material ensures that the photocatalytically active washcoat adheres to the substrate's exterior surface.

The substrate can be disposed within a housing. Possible housings can include a receptacle, canister, shell, and the like, having a geometry such as rectangular, cylindrical, and other rounded or multi-sided shapes. The housing includes at least one opening for the passage of the hydrocarbon flow through the catalytic converter. At least one end of the housing can be placed in fluid communication with a carbon canister of the evaporative emissions system, e.g., using an air line. The opposing end can be fitted to an exhaust port. The housing can comprise ferrous and non-ferrous materials. Possible ferrous and non-ferrous materials can include molded plastic, composite materials, ceramics, carbon steels, and combinations comprising at least one of the foregoing materials, and the like.

The shell can optionally include at least one flow expander. The flow expander can comprise a device that expands the inlet and/or outlet of the photocatalytic device, so that the fluid flow strikes the greatest amount of substrate surface area without expanding or reducing the available cross-sectional area of the substrate. The flow expander can preferably be fitted within the inlet of the photocatalytic device, and optionally, within the outlet of the photocatalytic device. The flow expander can also preferably comprise the same materials as the shell.

If natural light will be partially or wholly employed, the shell preferably includes one or more sections comprising a transparent material, e.g., a material which is transparent to the wavelength of light that will activate the photocatalyst. Possible transparent materials include glass, (e.g., thermoplastic materials such as polycarbonates; and the like) LEXAN® commercially available from the General Electric Company, Pittsfield, Mass., fluorosilicate crowned glass, fused silica, and combinations comprising at least one of the foregoing transparent materials, with fused silica preferred. The transparent sections are preferably sealingly secured within the shell's frame using a sealing agent. Possible sealing agents can include a joint configuration such as a lap joint, butt joint, tee joint, and the like; a weld such as a TIG weld, MIG weld, seam weld, and the like; crimps, snaps, lockseam, polymeric substances, elastomeric devices such as an o-ring, and combinations comprising at least one of the foregoing sealing agents, with an elastomeric o-ring preferred. The elastomeric o-ring can preferably be disposed between the transparent sections and shell to preferably prevent leakage and, to ensure a gas tight seal.

The transparent material can allow an ambient or artificial light source to penetrate its surface such that the light illuminates the substrate and causes the photocatalytic reaction to occur. The light source can preferably emit light in the ultra violet spectrum ("UV"), with a near UV or long UV wavelength transmission preferred, and a wavelength of about 300 nanometers to about 400 nanometers especially preferred. An alternative to an ambient light source, such as sunlight, is one or more artificial light sources mounted within the photocatalytic device. Possible artificial light sources can include any conventional UV light source such as a UV lamp, and the like.

An activation system can be employed turn the artificial light source on and off when necessary. Possible activation systems can include hydrocarbon sensors, timing devices, and combinations comprising at least one of the foregoing activation systems. For example, conventional hydrocarbon sensor can detect hydrocarbons in the vapors entering the photocatalytic device, and activate the light source. When photocatalysis is complete, the hydrocarbon sensor will detect that the hydrocarbons have been reduced to the desired level (e.g., it will preferably detect no hydrocarbons present) and deactivate the light source. In the alternative, a timing device can be set to periodically activate and deactivate the light source, such as according to a diurnal heating schedule as is known in the art.

Figure 2:
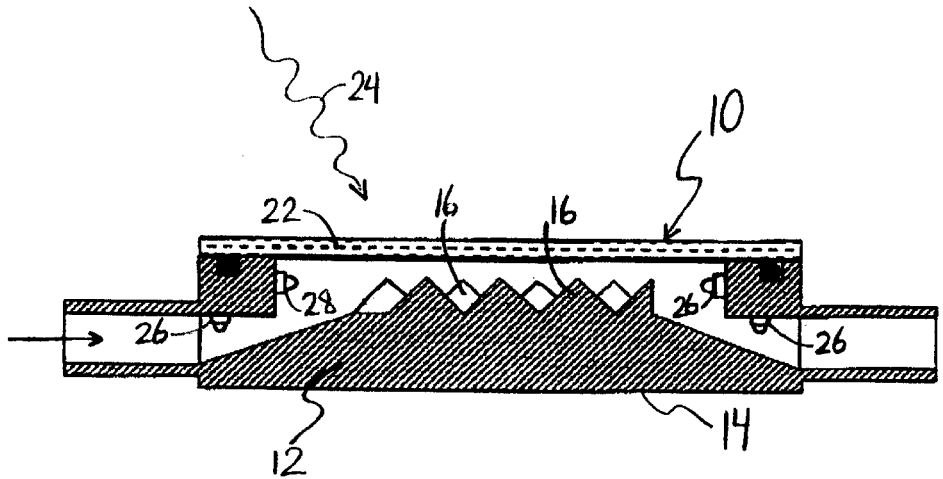
FIG. 2 is a partial cross-sectional side view of the embodiment of FIG. 1 illustrating the structural features of the substrate of the photocatalyst system.

FIGS. 1–2 illustrate partial cross-sectional views of one embodiment of the photocatalyst system 10. A substrate 12, housed within a shell 14, comprises one or more photocatalytically active materials. The photocatalytically active materials are disposed on the exterior surface of the substrate 12, and preferably disposed upon a plurality of structural features 16, e.g., pyramidal shaped structural features, located on the substrate's exterior surface. The substrate 12 is preferably disposed between an inlet flow expander 18 and an outlet flow expander 20 within the shell 14. The shell 14 includes one or more sections of transparent material 22 that surround the substrate 12. Ambient light waves 24 can penetrate the transparent sections 22 and illuminate the substrate 12. In addition to the ambient light 24, or as an alternative, a light source 26 can be mounted within either or both the flow expanders 18, 20, as well as the interior of the shell 14. The light source 26 can be activated by a hydrocarbon sensor 28, a timing device (not shown), and/or an ambient temperature sensor (not shown), to illuminate the substrate 12.

Figure 3:
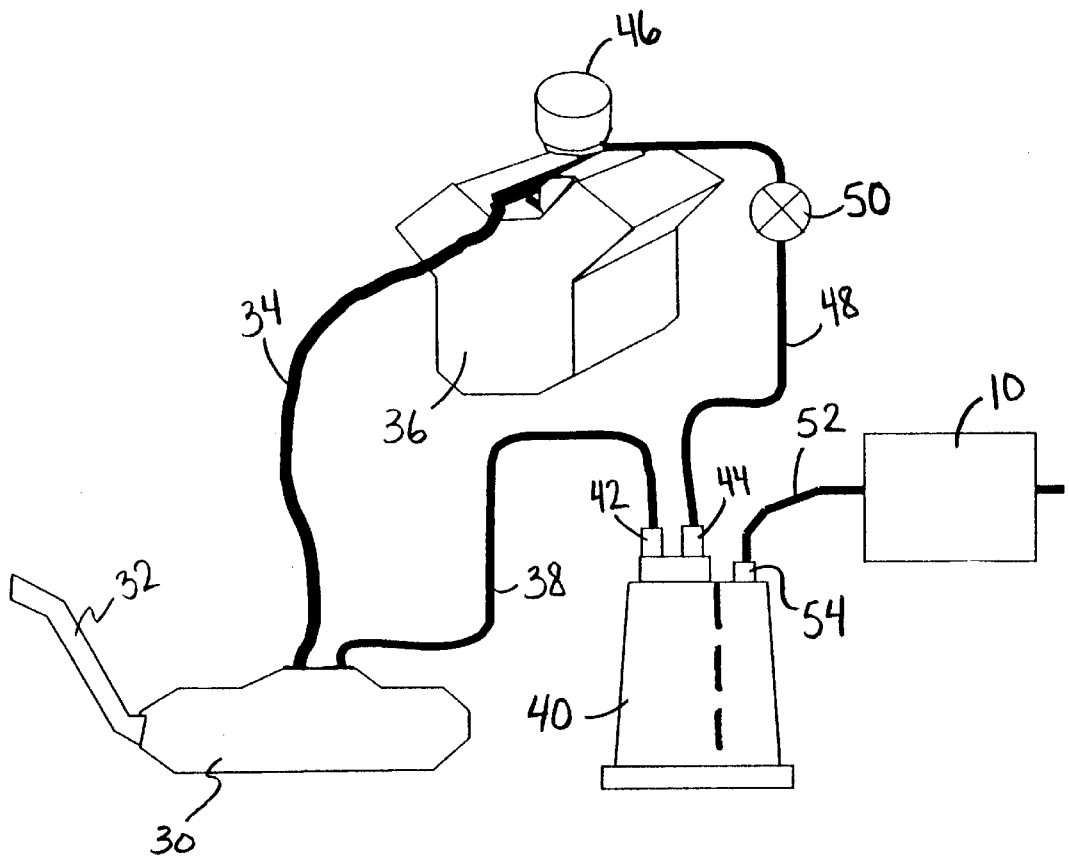
FIG. 3 is a flow diagram of an embodiment of an evaporative emissions system.

Referring now to FIG. 3, a gas tank 30 receives a quantity of fuel through a filler tube 32. During operation of the vehicle, the fuel flows through a fuel line 34 to an internal combustion engine 36 to power the vehicle. The gas tank 30 maintains a pressure about equivalent to atmosphere by venting evaporated fuel and air through a vent line 38 to a carbon canister 40. The vent line 38 is connected to the carbon canister by a tank port 42. The tank port 42 and a purge port 44 are connected within the carbon canister (not shown). When an air induction manifold 46 creates a vacuum within the system, a canister purge control valve 50 can open a purge line 48 to the carbon canister 40, and induce a vacuum on both the carbon canister 40 and photocatalytic device 10. As the vacuum is being applied, the evaporated fuel vapors are also being introduced through the vent line 38 and being pulled into the carbon canister 40, and then pulled out through a purge line 48 connected to the purge port 44. Some fuel vapors as well as air may also be pulled in through and/or an air line 52 into carbon canister 40 via an air port 54. The purged hydrocarbon vapors flow through the purge line 48, are periodically introduced into the engine 36 by a canister purge control valve 50 and one or more fuel injectors (not shown), and are combusted.

During operation of the vehicle, vapor is continuously flowing from the gas tank 30 to the carbon canister 40, and from the carbon canister 40 to the engine 36. When the engine 36 shuts down, vapor continues accumulating within the carbon canister 40, and the hydrocarbons become attracted to and adsorbed by the carbon particles. The carbon canister 40 at this time can release the excess vapor through the air line 52 and into the photocatalytic device 10. The hydrocarbon vapor is photocatalytically treated by the photocatalytic device such that the hydrocarbons present are converted to carbon dioxide and water vapor, which can then exit to the atmosphere. Furthermore, in another embodiment of the evaporative emission treatment system, the photocatalytic device 10 can replace the carbon canister 40, and photocatalytically treat all vented evaporated emissions from the gas tank 30.

The photocatalyst system possesses several advantages over conventional evaporative emissions treatment systems. The photocatalytic system can operate under typical diurnal cycles without requiring regeneration of materials. In addition, the photocatalyst system can be mounted virtually anywhere in an automotive vehicle. For example, photocatalyst system can be mounted so that a transparent section is fitted within either the front or rear bumper, and be exposed to an ambient light source such as the sun. In the alternative, the photocatalytic device can incorporate an artificial light source, and be placed under the hood or elsewhere in the automotive vehicle. Basically, the photocatalytic device can be conveniently placed in an automotive vehicle according to the customer's specifications and packaging constraint requirements. Consequently, the photocatalytic device can be customized and packaged according to the customer's and/or vehicle's requirements.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A photocatalytic device for fuel tank evaporative emissions, comprising:
   a substrate comprising a photocatalyst;
   a shell disposed about said substrate, and comprising one or more sections of transparent material capable of being penetrated by an ultra violet light transmission;
   a sealing agent disposed between said shell and said sections of transparent material; and
   an ultra violet light source disposed within said shell.

2. The photocatalytic device of claim 1, further comprising a light source activation system disposed within said shell, wherein said light source activation system is selected from the group consisting of a timer, hydrocarbon sensor, ambient temperature sensor, and combinations comprising at least one of the foregoing systems.

3. The photocatalytic device of claim 1, wherein said substrate further comprises a pyramidal shape.

4. The photocatalytic device of claim 1, wherein said substrate further comprises structural features having a shape selected from the group consisting of triangular, rectangular, pyramidal, pentagonal, hexagonal, heptagonal, octagonal, and combinations comprising at least one of the foregoing shapes.

5. The photocatalytic device of claim 1, wherein said transparent material is selected from the group consisting of glass, thermoplastic material, fluorosilicate crowned glass, fused silica, and combinations comprising at least one of the foregoing transparent materials.

6. The photocatalytic device of claim 1, wherein said sealing agent is selected from the group consisting of a joint, weld, crimp, snap, polymeric substance, elastomeric device, and combinations comprising at least one of the foregoing sealing agents.

7. The photocatalytic device of claim 1, wherein said photocatalyst further comprises titanium oxide.

8. The photocatalytic device of claim 7, wherein said photocatalyst further comprises a catalyst selected from the group consisting of platinum, palladium, rhodium, and combinations comprising at least one of the foregoing catalysts.

9. The photocatalytic device of claim 8, wherein said catalyst is platinum.

10. The photocatalytic device of claim 8, wherein said photocatalyst further comprises aluminum oxide.

11. A photocatalytic device for fuel tank evaporative emissions, comprising:
    a substrate comprising a photocatalyst;
    a shell disposed about said substrate, and comprising one or more sections of transparent material capable of being penetrated by an ultra violet light transmission;
    a sealing agent disposed between said shell and said sections of transparent material; and
    an inlet flow expander disposed at an inlet of said shell.

12. A photocatalytic device for fuel tank evaporative emissions, comprising:
    a substrate comprising a photocatalyst;
    a shell disposed about said substrate, and comprising one or more sections of transparent material capable of being penetrated by an ultra violet light transmission;
    a sealing agent disposed between said shell and said sections of transparent material, wherein said sealing agent is selected from the group consisting of a joint, weld, crimp, snap, polymeric substance, elastomeric device, and combinations comprising at least one of the foregoing sealing agents, and wherein said sealing agent further comprises an elastomeric O-ring.

13. A method for photo catalytically treating evaporative emissions comprising:

directing fuel vapor from a fuel tank into a photocatalytic device comprising a photocatalyst, a shell disposed about said photocatalyst comprising one or more sections of transparent material capable of being penetrated by an ultra violet light transmission, in communication with an ultraviolet light source;

activating said photocatalyst with light; and converting hydrocarbon in said fuel vapor to carbon dioxide and water.

14. The method of claim 13, further comprising illuminating said photocatalyst with an ambient light source.

15. The method of claim 13, further comprising illuminating said photocatalyst with an ultra violet light source.

16. A fuel vapor management system, comprising:

a fuel tank;

a photocatalytic device in fluid communication with said fuel tank and in communication with an ultraviolet light source, said photocatalytic device comprising a substrate with a photocatalyst and a shell disposed about said substrate, wherein said shell further comprises one or more sections of transparent material capable of being penetrated by said ultraviolet light source.

17. The fuel vapor management system of claim 16, further comprising a carbon canister disposed between and in fluid communication with said fuel tank and said photocatalytic device.

18. The fuel vapor management system of claim 17, wherein said carbon canister is in fluid communication with an engine.

19. The fuel vapor management system of claim 16, wherein said ultraviolet light source comprises artificial light.

20. The fuel vapor management system of claim 16, wherein said photocatalyst comprises titanium oxide.

21. The fuel vapor management system of claim 20, wherein said photocatalyst further comprises a catalyst is selected from the group consisting of platinum, palladium, rhodium, and combinations comprising at least one of the foregoing catalysts.

22. The fuel vapor management system of claim 21, wherein said catalyst comprises platinum.

23. The fuel vapor management system of claim 20, wherein said photocatalyst further comprises aluminum oxide.

24. A method for managing fuel vapor, comprising:

directing the fuel vapor from a fuel tank into a photocatalytic device; said photocatalytic device comprising a shell disposed about a photocatalyst, the shell comprising one or more sections of transparent material capable of being penetrated by an ultra violet light transmission, in communication with an ultraviolet light source;

introducing the fuel vapor to the photocatalyst;

illuminating the photocatalyst; and converting hydrocarbon to water and carbon dioxide.

25. The method of claim 24, further comprising directing the fuel vapor from said fuel tank to a carbon canister, and directing at least a first portion of said fuel vapor from said carbon canister to said photocatalytic device.

26. The method of claim 25, wherein said photocatalyst comprises titanium oxide.

27. The method of claim 26, wherein said photocatalyst further comprises a catalyst is selected from the group consisting of platinum, palladium, rhodium, and combinations comprising at least one of the foregoing catalysts.

28. The method of claim 27, wherein said catalyst comprises platinum.

29. A method for managing fuel vapor, comprising:

directing the fuel vapor from a fuel tank to a carbon canister, and directing at least a first portion of said fuel vapor from said carbon canister into a photocatalytic device;

introducing the fuel vapor to a photocatalyst;

illuminating the photocatalyst;

converting hydrocarbon to water and carbon dioxide; and directing at least a second portion of said fuel vapor to an engine.

30. A fuel vapor management system, comprising:

a fuiel tank;

a photocatalytic device in fluid communication with said fuel tank, said photocatalytic device comprising substrate with a titanium oxide photocatalyst and a shell disposed about said substrate, wherein said shell comprises one or more sections of a transparent material capable of being penetrated by an ultra violet light transmission; and an ultraviolet light source.

* * * * *